United States Patent
Ishino

(10) Patent No.: US 10,574,738 B2
(45) Date of Patent: Feb. 25, 2020

(54) RELAY APPARATUS, CLIENT APPARATUS, AND COMPUTER-READABLE MEDIUM

(71) Applicant: FUJI XEROX CO., LTD., Tokyo (JP)

(72) Inventor: Shigeki Ishino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/936,003

(22) Filed: Mar. 26, 2018

(65) Prior Publication Data
US 2018/0219939 A1    Aug. 2, 2018

Related U.S. Application Data

(63) Continuation of application No. 14/053,916, filed on Oct. 15, 2013, now abandoned.

(30) Foreign Application Priority Data

Mar. 5, 2013 (JP) ................. 2013-043210

(51) Int. Cl.
*H04L 29/08* (2006.01)

(52) U.S. Cl.
CPC .......... *H04L 67/10* (2013.01); *H04L 67/1097* (2013.01); *H04L 67/2823* (2013.01)

(58) Field of Classification Search
CPC .. H04L 67/10; H04L 67/1097; H04L 67/2823
(Continued)

(56) References Cited

U.S. PATENT DOCUMENTS

| 7,664,738 B2 | 2/2010 | Sohma |
| 9,037,563 B1 | 5/2015 | Chu et al. |

(Continued)

FOREIGN PATENT DOCUMENTS

| JP | 2001-344241 A | 12/2001 |
| JP | 2006-163842 A | 6/2006 |
| JP | 2012-113701 A | 6/2012 |

OTHER PUBLICATIONS

Jan. 19, 2016 Office Action issued in Japanese Patent Application No. 2013-043210.

(Continued)

*Primary Examiner* — Tonia L Dollinger
*Assistant Examiner* — Adam A Cooney
(74) *Attorney, Agent, or Firm* — Oliff PLC

(57) ABSTRACT

A relay apparatus includes a storage, request data reception and transmission units, a mode data reception unit, a specified condition conversion unit, a content identifier reception unit, a generation unit, and a display data transmission unit. The storage stores a service identifier, access destination information, and a conversion routine for the format of a specified condition specifying content, for each of storage services. The request data reception unit receives a service identifier and a specified condition from a client apparatus. The mode data reception unit receives mode data specifying a client apparatus display format. The specified condition conversion unit converts the specified condition into a server format, which is transmitted by the request data transmission unit using access destination information. The content identifier reception unit receives content identifiers from the server, for which the generation unit generates display data. The display data transmission unit transmits it to the client apparatus.

6 Claims, 12 Drawing Sheets

(58) Field of Classification Search
USPC .......................................................... 709/219
See application file for complete search history.

(56) References Cited

U.S. PATENT DOCUMENTS

| | | | | | |
|---|---|---|---|---|---|
| 2006/0122986 | A1* | 6/2006 | Sohma | ................... | G06F 16/48 |
| 2007/0011147 | A1* | 1/2007 | Falkenberg | ............ | G06Q 10/10 |
| 2007/0088702 | A1* | 4/2007 | Fridella | ............. | H04L 29/12169 |
| 2008/0072180 | A1* | 3/2008 | Chevalier | ............. | G06F 3/0481 715/861 |
| 2010/0100550 | A1* | 4/2010 | Kitayama | ............... | G06F 16/14 707/741 |
| 2010/0265536 | A1* | 10/2010 | Hiraki | ................... | G06F 3/1203 358/1.15 |
| 2012/0047168 | A1* | 2/2012 | Yokoi | ................ | G06F 16/9535 707/770 |
| 2012/0089630 | A1* | 4/2012 | Gilula | ................ | G06Q 30/0256 707/765 |
| 2012/0117629 | A1* | 5/2012 | Miyazawa | .............. | H04L 63/08 726/4 |
| 2013/0124552 | A1* | 5/2013 | Stevenson | ............. | G06F 16/951 707/759 |
| 2013/0124562 | A1* | 5/2013 | Christensen | .......... | G06F 16/951 707/770 |
| 2013/0144891 | A1* | 6/2013 | Nagasaka | ............ | H04N 21/251 707/749 |
| 2013/0163027 | A1* | 6/2013 | Shustef | ............... | H04L 63/0209 358/1.14 |

OTHER PUBLICATIONS

Sep. 4, 2017 Office Action issued in Chinese Patent Application No. 201310659229.1.

Apr. 19, 2018 Office Action issued in Chinese Patent Application No. 201310659229.1.

* cited by examiner

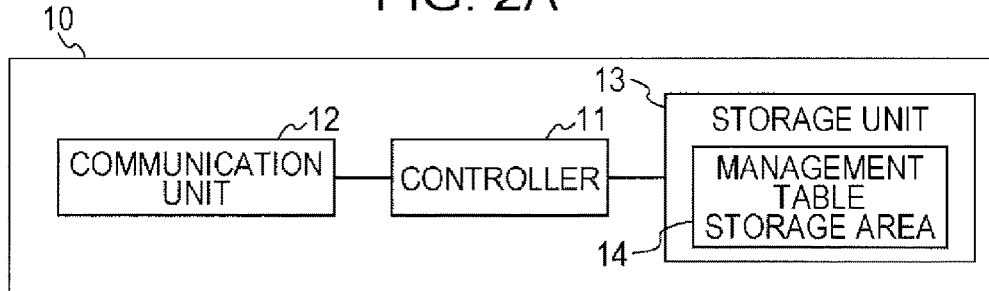
FIG. 2A
FIG. 2B
| SVC IDENTIFIER | ACCESS DESTINATION | IDENTIFIER CONVERSION ROUTINE | CONDITIONAL EXPRESSION CONVERSION ROUTINE |
|---|---|---|---|
| id:svc:service-A | http://www.serviceA | ConvertForA() | ConvertCondForA() |
| id:svc:service-B | http://www.serviceB | ConvertForB() | ConvertCondForB() |
| ⋮ | ⋮ | ⋮ | ⋮ |
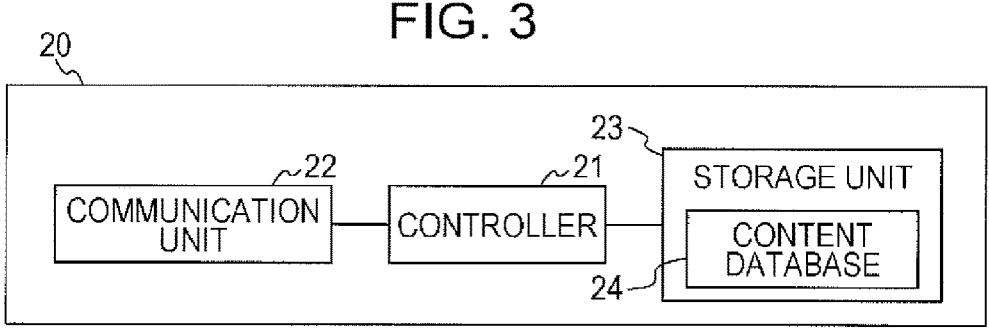
FIG. 3

FIG. 7

Search for content.
Input search condition.

Keyword: [ ... ]

Save date and time: [ xx/xx/2013 ] To [ xx/xx/2013 ]

Storage service to be searched

[✓] Storage service A

[ ] Storage service B

[✓] Storage service C

Select how to display search results.

RB1
  ● Not specified (display on content-by-content basis)
RB2
  ○ Not specified (display on service-by-service basis)
RB3
  ○ Specify display order (display on service-by-service basis)
⋮
  ○ Specify display order (display on content-by-content basis)

○ Combine above display rules

○ Display the number of hits on service-by-service basis

[ OK ]

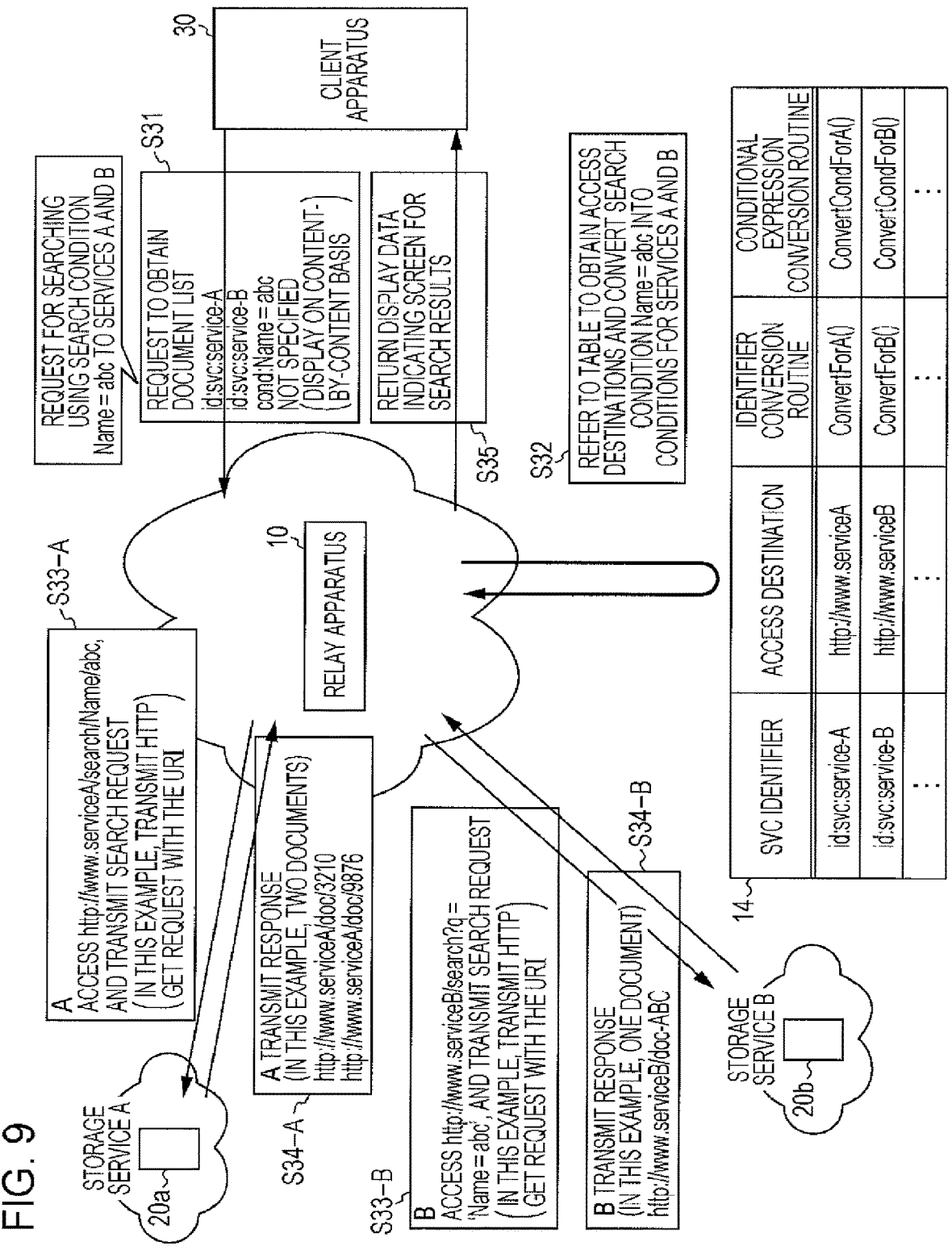

FIG. 10

Search results: Not specified (display on content-by-content basis)

| Content Name | Storage Service Name | Save Date and Time | ... |
|---|---|---|---|
| Content 11 | Storage Service C | xx/xx/2013 | ... |
| Content 02 | Storage Service A | xx/xx/2012 | ... |
| Content 23 | Storage Service B | xx/xx/2012 | ... |
| Content 54 | Storage Service A | xx/xx/2013 | ... |
| ⋮ | ⋮ | ⋮ | ⋮ |

FIG. 11

Search results: Not specified (display on service-by-service basis)

Storage service C:

| Content Name | Save Date and Time | ... |
|---|---|---|
| Content 11 | xx/xx/2013 | ... |
| Content 32 | xx/xx/2012 | ... |

Storage service A:

| Content 02 | xx/xx/2012 | ... |
|---|---|---|
| Content 54 | xx/xx/2013 | ... |

Search results: Display in specified order of services

Storage service A:

| Content Name | Save Date and Time | ... |
|---|---|---|
| Content 02 | xx/xx/2012 | ... |
| Content 54 | xx/xx/2013 | ... |

Storage service C:

| Content 11 | xx/xx/2013 | ... |
|---|---|---|
| Content 32 | xx/xx/2012 | ... |

Search results: Display on ascending order of content name

| Content Name | Storage Service Name | Save Date and Time | ... |
|---|---|---|---|
| Content 02 | Storage Service A | xx/xx/2012 | ... |
| Content 11 | Storage Service C | xx/xx/2013 | ... |
| Content 23 | Storage Service B | xx/xx/2012 | ... |
| Content 54 | Storage Service A | xx/xx/2013 | ... |
| ⋮ | ⋮ | ⋮ | ⋮ |

FIG. 14

Search results : Display in specified order of services/
creation date of content (ascending order)

Storage service A:

| Content Name | Save Date and Time | ... |
|---|---|---|
| Content 02 | xx/xx/2012 | ... |
| Content 54 | xx/xx/2013 | ... |

Storage service C:

| Content 32 | xx/xx/2012 | ... |
|---|---|---|
| Content 11 | xx/xx/2013 | ... |

FIG. 15

Search results: Display the number of hits on service-by-service basis

| | | |
|---|---|---|
| Storage service A: | 10 hits | [Display list] ~271 |
| Storage service B: | 7 hits | [Display list] ~272 |
| Storage service C: | None | [Display list] ~273 |
| Storage service D: | 3 hits | [Display list] ~274 |

270

Perform display by combining display rules.
Select combination of rules.

☐ Not specified (display on content-by-content basis)
☑ Not specified (display on service-by-service basis)
☑ Specify display order (display on service-by-service basis)
☐ Specify display order (display on content-by-content basis)

Next

RELAY APPARATUS, CLIENT APPARATUS, AND COMPUTER-READABLE MEDIUM

CROSS-REFERENCE TO RELATED APPLICATIONS

This application is a continuation application of U.S. patent application Ser. No. 14/053,916, filed Oct. 15, 2013, which is based on and claims priority under 35 USC 119 from Japanese Patent Application No. 2013-043210 filed Mar. 5, 2013.

BACKGROUND

(i) Technical Field

The present invention relates to a relay apparatus, a client apparatus, and a computer-readable medium.

(ii) Related Art

A service called a cloud service or cloud computing is known. In such a service, for example, servers on a network, instead of client apparatuses, perform various types of information processing, such as data storage and data format conversion. In the field of such a service, a technique has been proposed in which communication is relayed between a server and client apparatuses.

SUMMARY

According to an aspect of the present invention, there is provided a relay apparatus including a storage, a request data reception unit, a mode data reception unit, a specified condition conversion unit, a request data transmission unit, a content identifier reception unit, a generation unit, and a display data transmission unit. The storage stores a service identifier, access destination information, and a conversion routine which are associated with each other, for each of multiple storage services. The service identifier is an identifier for identifying the storage service. The access destination information indicates information used to access a server which provides the storage service. The conversion routine indicates a rule for converting a format of a specified condition indicating a condition used to specify one or more pieces of content between a format used in the server providing the storage service and a format used in a client apparatus. The request data reception unit receives a service identifier and a specified condition as request data from the client apparatus. The mode data reception unit receives mode data for specifying a display format used when the client apparatus displays a search result according to the specified condition received by the request data reception unit. The specified condition conversion unit converts the specified condition received by the request data reception unit into a format used in the server, in accordance with a conversion routine stored in the storage in such a manner that the conversion routine is associated with the service identifier received by the request data reception unit. The request data transmission unit transmits the specified condition obtained through the conversion performed by the specified condition conversion unit, as request data in accordance with access destination information stored in the storage in such a manner that the access destination information is associated with the service identifier received by the request data reception unit. The content identifier reception unit receives a content identifier transmitted from the server as a response to the request data transmitted by the request data transmission unit. The generation unit generates display data indicating an instruction to display the content identifier received by the content identifier reception unit in the display format specified by the mode data received by the mode data reception unit. The display data transmission unit transmits the display data generated by the generation unit, as a response to the request data received by the request data reception unit to the client apparatus.

BRIEF DESCRIPTION OF THE DRAWINGS

Exemplary embodiments of the present invention will be described in detail based on the following figures, wherein:

FIG. 2A is a diagram illustrating the hardware configuration of a relay apparatus;

FIG. 2B is a diagram illustrating an exemplary management table;

FIG. 3 is a diagram illustrating the hardware configuration of a storage service providing apparatus;

FIG. 7 is a diagram illustrating an exemplary screen for inputting a search condition;

FIG. 8 is a diagram illustrating an exemplary screen for setting a display mode;

FIG. 9 is a diagram for describing an operation of searching for content;

FIG. 10 is a diagram illustrating an exemplary screen showing search results;

FIG. 11 is a diagram illustrating an exemplary screen showing search results;

FIG. 12 is a diagram illustrating an exemplary screen showing search results;

FIG. 13 is a diagram illustrating an exemplary screen showing search results;

FIG. 14 is a diagram illustrating an exemplary screen showing search results;

FIG. 15 is a diagram illustrating an exemplary screen showing search results;

DETAILED DESCRIPTION

1. Exemplary Embodiment

1-1. Overall Configuration

Figure 1:
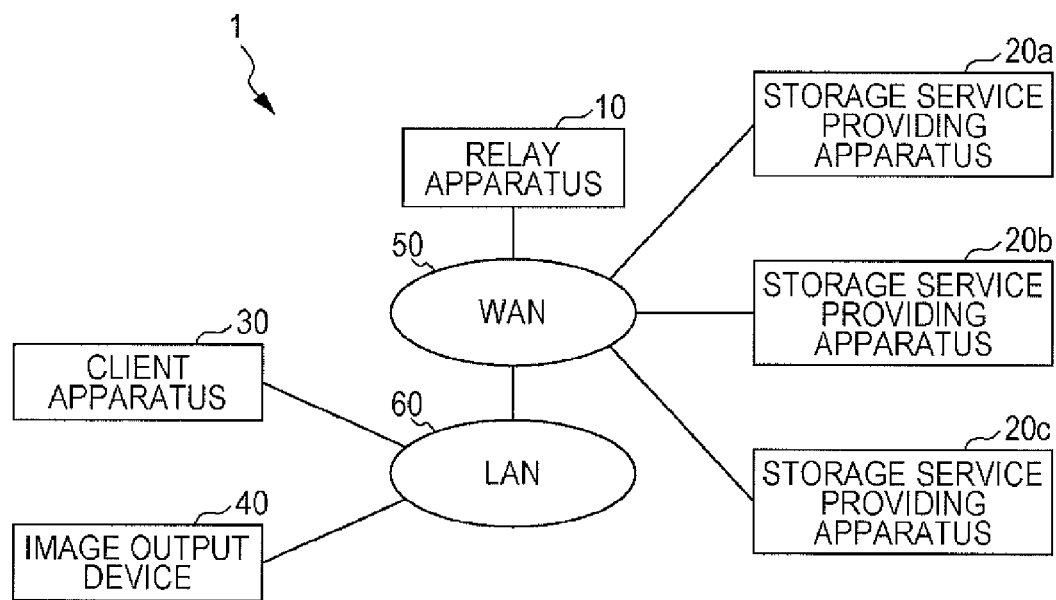
FIG. 1 is a block diagram illustrating the overall configuration of a communication system.

FIG. 1 is a block diagram illustrating the overall configuration of a communication system 1 according to an exemplary embodiment of the present invention. The communication system 1 includes a relay apparatus 10, storage service providing apparatuses 20a, 20b, and 20c, a client apparatus 30, an image output device 40, a wide area network (WAN) 50, and a local area network (LAN) 60. The storage service providing apparatuses 20a, 20b, and 20c are apparatuses, each of which provides a so-called storage service. The WAN 50 is a communication line in a wide area which connects the relay apparatus 10, the storage service providing apparatuses 20a, 20b, and 20c, and the LAN 60 to each other, and which transfers information transmitted and received between these. The WAN 50 is, for example, the Internet.

The LAN 60 is a communication line which is connected to the client apparatus 30 and the image output device 40, and which transfers information transmitted and received between these and the WAN 50. A gateway server (not illustrated) connected to the WAN 50 is provided for the LAN 60. The gateway server permits communication from an apparatus connected to the LAN 60 (hereinafter, referred to as a LAN 60 side apparatus) to an apparatus connected to the WAN 50 (hereinafter, referred to as a WAN 50 side apparatus). In contrast, for communication from a WAN 50 side apparatus to a LAN 60 side apparatus, the gateway server permits only responses to communication requested by the LAN 60 side apparatus, and interrupts communication other than the responses. That is, the gateway server functions as a so-called firewall.

The client apparatus 30 is connected to the LAN 60, and is an apparatus for receiving a user operation and specifying output of content indicated by the operation to the relay apparatus 10. The client apparatus 30 is, for example, a smartphone or a tablet personal computer.

The relay apparatus 10 is connected to the WAN 50, and is an apparatus for providing requested content to the image output device 40. The relay apparatus 10 receives the specification from the client apparatus 30, and obtains the content indicated by the specification from either of the storage service providing apparatuses 20a, 20b, and 20c. The relay apparatus 10 stores the obtained content in itself, and notifies the client apparatus 30 of the uniform resource identifier (URI) which indicates the storage location of the content.

The storage service providing apparatuses 20a, 20b, and 20c are servers connected to the WAN 50, and store content. The storage service providing apparatuses 20a, 20b, and 20c receive a request to obtain content, from the relay apparatus 10, and provide the requested content to the relay apparatus 10. The storage service providing apparatuses 20a, 20b, and 20c receive/transmit data from/to another apparatus in different formats. Although the formats in which the storage service providing apparatuses 20a, 20b, and 20c receive/transmit data from/to another apparatus are different from each other, each of the storage service providing apparatuses 20a, 20b, and 20c has a similar hardware configuration, and performs a similar operation. Hereinafter, except in the case where the storage service providing apparatuses 20a, 20b, and 20c are to be separately described, each of the storage service providing apparatuses 20a, 20b, and 20c is called a storage service providing apparatus 20.

The image output device 40 obtains the URI transmitted from the relay apparatus 10 to the client apparatus 30, from the client apparatus 30. The image output device 40 uses the obtained URI to request the content stored in the storage area indicated by the URI, from the relay apparatus 10. Receiving the request, the relay apparatus 10 provides the content to the image output device 40. The image output device 40 outputs the content provided from the relay apparatus 10. The image output device 40 is, for example, an electrophotographic image forming apparatus, and outputs the content by forming an image indicated by the content on a medium such as paper.

1-2. Configuration of Relay Apparatus

FIG. 2A is a diagram illustrating the configuration of the relay apparatus 10. In FIG. 2A, a controller 11 includes an arithmetic and logic unit such as a central processing unit (CPU) and main storages, such as a read only memory (ROM) and a random access memory (RAM). The arithmetic and logic unit uses the RAM as a work area and executes programs stored in the ROM or a storage unit 13, thereby controlling operations of units of the relay apparatus 10. A communication unit 12 is an interface for communicating via the WAN 50 to another apparatus. The storage unit 13 is a storage device such as a hard disk, and stores data and programs which are used by the controller 11. The storage unit 13 has a management table storage area 14. The management table storage area 14 stores information for accessing the storage service providing apparatuses 20.

FIG. 2B is a diagram illustrating an exemplary management table. As illustrated in FIG. 2B, items "SVC identifier", "access destination", "identifier conversion routine", and "conditional expression conversion routine" are stored in the table in such a manner as to be associated with each other. Among these items, a service identifier for identifying a storage service is stored in the item "SVC identifier". Access destination information indicating information for accessing a storage service providing apparatus 20 which provides a storage service is stored in the item "access destination". In the exemplary embodiment, a URI is stored as access destination information. An identifier conversion routine (exemplary conversion routine) indicating rules for converting the format of a content identifier identifying content and the format of a folder identifier (exemplary specified condition) identifying a folder between the format used in a storage service providing apparatus 20 and the format used in the client apparatus 30 is stored in the item "identifier conversion routine". In the exemplary embodiment, it is assumed that each storage service uses a different format for a content identifier and a folder identifier. In the example illustrated in FIG. 2B, for example, a service identifier "service-A" is associated with an identifier conversion routine "ConvertForA( )". A conditional expression conversion routine (exemplary conversion routine) indicating a rule for converting the format of a specified condition indicating a condition for specifying one or more pieces of content between the format used in a storage service providing apparatus 20 and the format used in the client apparatus 30 is stored in the item "conditional expression conversion routine".

The relay apparatus 10 and the client apparatus 30 receive/transmit data from/to each other in a format which is independent of data formats defined in the storage services. The "identifier conversion routine" is used to convert a content identifier and a folder identifier described in a format used in data communication between the client apparatus 30 and the relay apparatus 10 into identifiers in a format corresponding to each of the storage services. The "conditional expression conversion routine" is used to convert a conditional expression described in a format used in data communication between the client apparatus 30 and the relay apparatus 10 into a conditional expression in a format corresponding to each of the storage services.

1-3. Configuration of Storage Service Providing Apparatus

FIG. 3 is a diagram illustrating the configuration of a storage service providing apparatus 20. In FIG. 3, a controller 21 includes an arithmetic and logic unit such as a CPU and main storages, such as a ROM and a RAM. The arithmetic and logic unit uses the RAM as a work area and executes programs stored in the ROM or a storage unit 23, thereby controlling operations of units of the storage service providing apparatus 20. A communication unit 22 is an interface for communicating via the WAN 50 to another apparatus. The storage unit 23 is a storage device such as a hard disk, and stores data and programs which are used by the controller 21.

The storage unit 23 includes a content database 24 which stores content associated with information indicating the storage location of the content. Responding to a request from the relay apparatus 10, the controller 21 reads out content from the content database 24 and provides it. In the exemplary embodiment, "content" is used as a term representing data indicating various documents, images, and the like, such as document data representing a document or image data representing an image. Other than these, for example, "content" may be a computer program, and a set of data is called "content". In the exemplary embodiment, the content database 24 includes a table in which URIs such as "http://z**.com/C001" are described, as information indicating the storage location of content. Each URI is associated with a storage area for content.

1-4. Configuration of Client Apparatus

Figure 4:
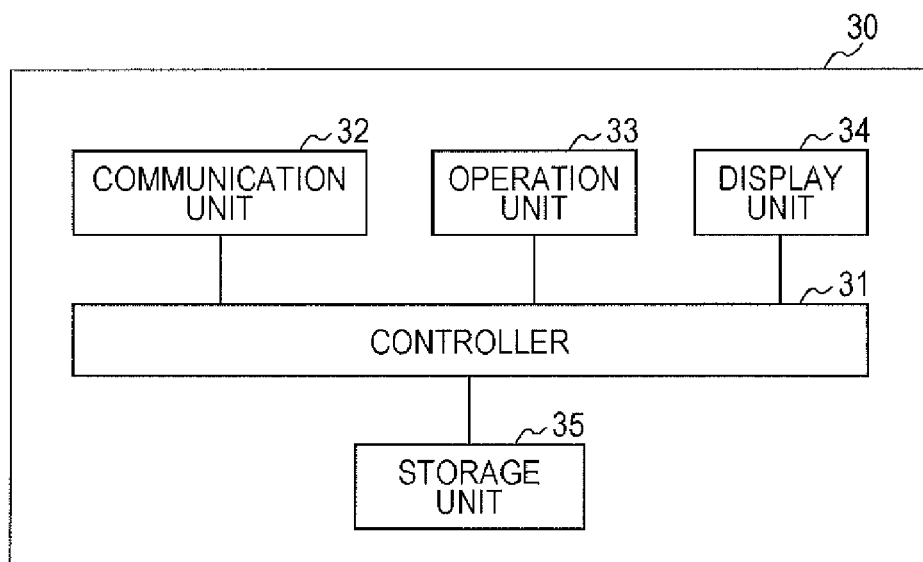
FIG. 4 is a diagram illustrating the hardware configuration of a client apparatus.

FIG. 4 is a diagram illustrating the hardware configuration of the client apparatus 30. In FIG. 4, a controller 31 includes an arithmetic and logic unit such as a CPU and main storages, such as a ROM and a RAM. The ROM stores programs executed by the arithmetic and logic unit. The arithmetic and logic unit uses the RAM as a work area and executes programs stored in the ROM or a storage unit 35, thereby controlling operations of units of the client apparatus 30. A communication unit 32 is an interface for communicating via the LAN 60 to another apparatus. An operation unit 33 includes operators, such as various keys and a touch sensor, and supplies an operation signal corresponding to a user operation to the controller 31. The controller 31 performs processing corresponding to the operation signal. A display unit 34 includes a liquid crystal panel and a liquid-crystal driving circuit, and displays an image under the control performed by the controller 31. The storage unit 35 is a storage device such as a hard disk, and stores data and programs which are used by the controller 31.

1-5. Configuration of Image Output Device

Figure 5:
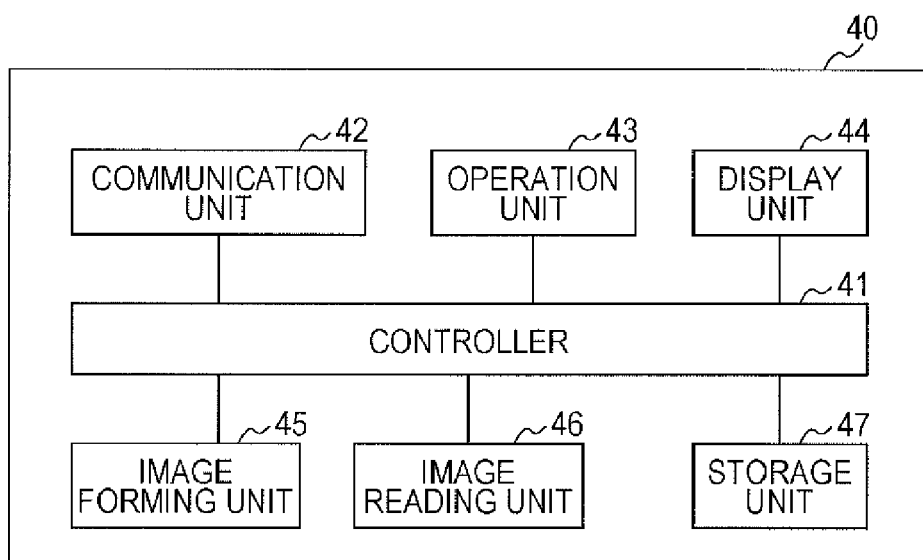
FIG. 5 is a diagram illustrating the hardware configuration of an image output device.

FIG. 5 is a diagram illustrating the hardware configuration of the image output device 40. In FIG. 5, a controller 41 includes an arithmetic and logic unit such as a CPU and main storages, such as a ROM and a RAM. The ROM stores programs executed by the arithmetic and logic unit. The arithmetic and logic unit uses the RAM as a work area and executes programs stored in the ROM or a storage unit 47, thereby controlling operations of units of the image output device 40. A communication unit 42 is an interface for communicating via the LAN 60 to another apparatus. An operation unit 43 includes operators, such as various keys and a touch sensor, and supplies an operation signal corresponding to a user operation to the controller 41. The controller 41 performs processing corresponding to the operation signal. A display unit 44 includes a liquid crystal panel and a liquid-crystal driving circuit, and displays an image under the control performed by the controller 41. An image forming unit 45 forms an image by using an electrophotographic system. An image reading unit 46 optically reads out an image on a document. The storage unit 47 is a storage device such as a hard disk, and stores data and programs which are used by the controller 41.

1-6. Functional Configuration

Figure 6:
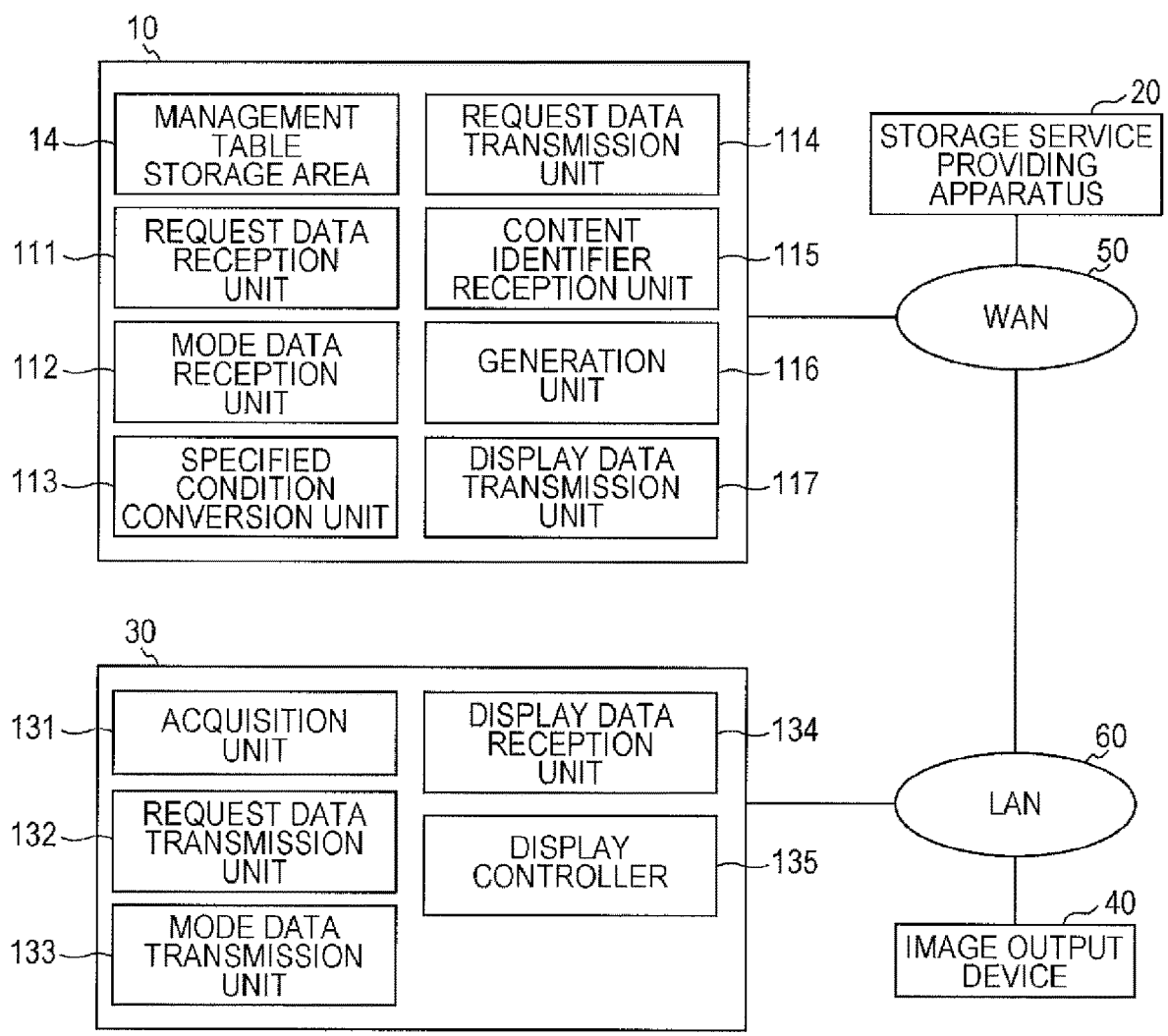
FIG. 6 is a diagram illustrating a functional configuration of the relay apparatus and the client apparatus.

FIG. 6 is a diagram illustrating a functional configuration of the relay apparatus 10 and the client apparatus 30. The relay apparatus 10 causes the controller 11, or the controller 11 and the communication unit 12, to achieve functions of a request data reception unit 111, a mode data reception unit 112, a specified condition conversion unit 113, a request data transmission unit 114, a content identifier reception unit 115, a generation unit 116, and a display data transmission unit 117. The request data reception unit 111 receives service identifiers and a specified condition from the client apparatus 30 as request data. In the exemplary embodiment, a folder identifier for specifying a folder and a conditional expression for specifying a search condition are used as specified conditions. The mode data reception unit 112 receives mode data for specifying a display format used when the client apparatus 30 displays search results according to the specified condition received by the request data reception unit 111.

The specified condition conversion unit 113 converts the specified condition received by the request data reception unit 111 into the formats used in storage service providing apparatuses 20 in accordance with conversion routines stored in the management table storage area 14 in such a manner that the conversion routines are associated with the service identifiers received by the request data reception unit 111. The request data transmission unit 114 transmits the specified conditions obtained through conversion performed by the specified condition conversion unit 113, as request data in accordance with access destination information stored in the management table storage area 14 in such a manner that the access destination information is associated with the service identifiers received by the request data reception unit 111.

The content identifier reception unit 115 receives content identifiers transmitted from the storage service providing apparatuses 20 as responses to the request data which has been transmitted by the request data transmission unit 114. The generation unit 116 generates display data instructing that the content identifiers received by the content identifier reception unit 115 be displayed in the display format specified by the mode data received by the mode data reception unit 112. The display data transmission unit 117 transmits the display data generated by the generation unit 116 to the client apparatus 30 as a response to the request data received by the request data reception unit 111.

The client apparatus 30 causes the controller 31, or the controller 31 and the communication unit 32, to achieve functions of an acquisition unit 131, a request data transmission unit 132, a mode data transmission unit 133, a display data reception unit 134, and a display controller 135. The acquisition unit 131 acquires service identifiers for identifying storage services, a specified condition indicating a condition for specifying one or more pieces of content, and a display format of search results according to the specified condition, in accordance with a user operation. The request data transmission unit 132 transmits the service identifiers and the specified condition acquired by the acquisition unit 131 to the relay apparatus 10 as request data. The mode data transmission unit 133 transmits the mode data acquired by the acquisition unit 131 to the relay apparatus 10. The display data reception unit 134 receives display data which instructs that content identifiers for identifying content be displayed, and which is transmitted from the relay apparatus 10 as a response to the request data which has been transmitted by the request data transmission unit 132. The display controller 135 causes the display unit 34 to display content identifiers in accordance with the display data received by the display data reception unit 134.

1-7. Operation 1-7-1. Operation of Searching for Content

An exemplary operation according to the exemplary embodiment will be described. An operation of searching storage services specified by a user for content will be described. In the description below, the storage service provided by the storage service providing apparatus 20*a* is called "storage service A", and the storage service provided by the storage service providing apparatus 20*b* is called "storage service B". In the example below, an operation performed when a user U searches the storage service A and the storage service B for content by specifying a conditional expression (Name=abc) will be described.

The user U operates the operation unit 33 to transmit an instruction to search for content. The controller 31 of the client apparatus 30 first displays a screen for inputting a search condition on the display unit 34 in accordance with information which is output from the operation unit 33.

FIG. 7 is a diagram illustrating an exemplary screen for inputting a search condition, which is displayed on the display unit 34. In the example in FIG. 7, text boxes for specifying a keyword and date and time, check boxes for selecting storage services to be searched, and the like are displayed. The user U operates the operation unit 33 to transmit an instruction to search the storage service A and the storage service B for content whose file name is "abc".

The controller 31 of the client apparatus 30 then displays a screen for selecting a display mode (display format of search results) on the display unit 34.

FIG. 8 is a diagram illustrating an exemplary screen displayed on the display unit 34. As illustrated in FIG. 8, radio buttons RB1, RB2, etc. for selecting how to display search results are displayed on the screen. In the exemplary embodiment, a screen for selecting either of display modes "not specified (display on content-by-content basis)", "not specified (display on service-by-service basis)", "specify display order (display on service-by-service basis)", "specify display order (display on content-by-content basis)", "combine above display rules", and "display the number of hits on service-by-service basis" as a display mode for search results is displayed.

The display modes illustrated in FIG. 8 will be described in detail in the description "Operation of Displaying Search Results" described below.

When the user U selects a display mode, the communication system 1 starts a series of processes of searching content. FIG. 9 is a diagram illustrating a flow of a content search operation according to the exemplary operation. When the user U inputs a search condition and a display mode, the controller 31 of the client apparatus 30 transmits search request data and data indicating the display mode specified by the user U (hereinafter, referred to as "mode data") to the relay apparatus 10 in accordance with information which is output from the operation unit 33 (in step S31). The search request data includes service identifiers for identifying storage services and a conditional expression indicating a search condition. Specifically, in the exemplary operation, the controller 31 transmits the search request data including "id:svc:service-A" and "id:svc:service-B" as service identifiers and "Name=abc" as a conditional expression, and mode data indicating "not specified (display on content-by-content basis)".

Receiving the search request data and the mode data from the client apparatus 30, the controller 11 of the relay apparatus 10 refers to the stored data in the management table storage area 14 to specify conditional expression conversion routines corresponding to the service identifiers included in the received search request data. The controller 11 of the relay apparatus 10 uses the specified conditional expression conversion routines to convert the conditional expression included in the received search request data into conditional expressions in the formats used in the storage services (in step S32). In the exemplary operation, the conditional expression "Name=abc" is converted into "search/Name/abc" by using a conditional expression conversion routine "ConvertCondForA( )", and is converted into "search?q='Name=abc'" by using a conditional expression conversion routine "ConvertCondForB( )".

The controller 11 uses access destination information corresponding to the service identifiers included in the search request data received in step S31, to transmit search request data to the storage service providing apparatuses 20 (in steps S33-A and S33-B). In the exemplary operation, the controller 11 transmits an HTTP GET request in which "http://www.serviceA/search/Name/abc" is specified as a URI to the storage service providing apparatus 20*a*. The controller 11 transmits an HTTP GET request in which "http://www.serviceB/search?q='Name=abc'" is specified as a URI to the storage service providing apparatus 20*b*.

Receiving search request data transmitted from the relay apparatus 10, a storage service providing apparatus 20 uses the conditional expression specified by the received search request data to search for content, and transmits a content list obtained through searching to the relay apparatus 10 (in steps S34-A and S34-B). At that time, a storage service providing apparatus 20 uses a content identifier in the format predetermined in the storage service for the storage service providing apparatus 20. Specifically, in the exemplary operation in FIG. 9, the storage service providing apparatus 20*a* transmits "http://www.serviceA/doc/3210" and "http://www.serviceA/doc/9876" as content identifiers to the relay apparatus 10. The storage service providing apparatus 20*b* transmits "http://www.serviceB/doc-ABC" as a content identifier to the relay apparatus 10.

Receiving content lists from the storage service providing apparatuses 20, the controller 11 of the relay apparatus 10 generates data (display data) indicating an instruction to display a screen as illustrated in FIG. 10 in accordance with the display mode "not specified (display on content-by-content basis)" specified by the mode data received in step S31, and transmits the generated data to the client apparatus 30 (in step S35). The client apparatus 30 displays a display screen for search results (list of content identifiers, i.e., content names) as illustrated in FIG. 10 in accordance with the display data transmitted from the relay apparatus 10.

1-7-2. Operation of Displaying Search Results

As described above, in the exemplary embodiment, the client apparatus 30 displays a screen (see FIG. 8) for prompting the user U to select a display aspect (display mode) of search results on the display unit 34. The storage service providing apparatuses 20 are different in processing speed, communication speed, and the like, and the time period required for searching depends on each of the storage service providing apparatuses 20. Therefore, search results for content are transmitted from the storage service providing apparatuses 20 at different timings depending on the storage service providing apparatuses 20. Accordingly, in the exemplary embodiment, the user U sets how to display search results which are transmitted at different timings.

The display modes, one of which the user U is allowed to select in the screen for selecting a display mode illustrated in FIG. 8, will be described below. The mode "not specified (display on content-by-content basis)" is a mode in which search results for content from the storage service providing apparatuses 20 are displayed one by one in the order of receipt of the search results.

As described above, FIG. 10 is a diagram illustrating an exemplary display aspect of search results obtained when the mode "not specified (display on content-by-content basis)" is selected. In the example in FIG. 10, pieces of content obtained through searching are displayed in a list in the order of receipt of search results. In this example, pieces of content in a search result received at an early timing are displayed on an upper side of the list. In this case, pieces of content received as a search result transmitted later are sequentially added to the end of the list.

The mode "not specified (display on service-by-service basis)" is a mode in which search results are displayed on a storage-service-by-storage-service basis in the order of receipt of the search results. FIG. 11 is a diagram illustrating an exemplary display screen showing search results in this mode. In the example illustrated in FIG. 11, search results are displayed on a storage-service-by-storage-service basis in the order of receipt of the search results. In this example, a storage service from which a search result is received at an early timing is displayed on an upper side of the list. In this case, for a service from which a search result is received later, the search result from the service is sequentially added to the end of the list and displayed.

The mode "specify display order (display on service-by-service basis)" indicates a mode in which a user U specifies a display order on a service-by-service basis. FIG. 12 is a diagram illustrating an exemplary display screen showing search results in this mode. In the example illustrated in FIG. 12, search results are displayed on a storage-service-by-storage-service basis in the order specified by the user U.

The mode "specify display order (display on content-by-content basis)" indicates a mode in which a user U specifies a display order on a content-by-content basis. FIG. 13 is a diagram illustrating an exemplary display screen showing search results in this mode. In the example illustrated in FIG. 13, pieces of content obtained through searching are displayed in the order specified by the user U (for example, in ascending order of content name, or in ascending order of save date and time).

The mode "combine above display rules" indicates a mode in which a user U specifies a display order for some pieces of content or some storage services. FIG. 14 is a diagram illustrating an exemplary display screen showing search results in this mode. FIG. 14 illustrates an example in which a user U specifies a display order for some storage services and also specifies "creation date of content (ascending order)" used as a display order of the content obtained through search of the services, and in which search results are displayed on a storage-service-by-storage-service basis in the specified order by sorting the pieces of content obtained through the search of the storage services, in ascending order of creation date. In this case, storage services for which a display order is not specified are sequentially added to the end of the list in the order of receipt of the search results and displayed.

The mode "display the number of hits on service-by-service basis" indicates a mode in which the number of pieces of content obtained through searching is displayed on a storage-service-by-storage-service basis. FIG. 15 is a diagram illustrating an exemplary display screen showing search results in this mode. In the example illustrated in FIG. 15, the number of pieces of content obtained through searching is displayed for each of the storage services.

Figure 16:
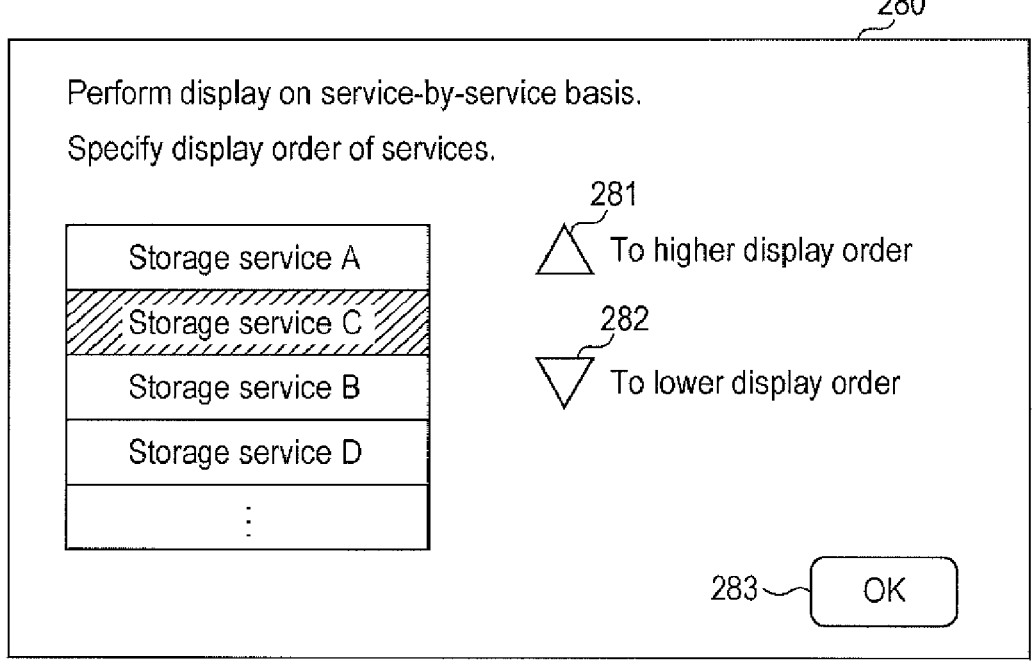
FIG. 16 is a diagram illustrating an exemplary screen for setting a display mode.

In the selection screen illustrated in FIG. 8, a user U selects either of the modes. When either of the modes "not specified (display on content-by-content basis)", "not specified (display on service-by-service basis)", and "display the number of hits on service-by-service basis" is selected, the controller 31 generates mode data indicating the selected mode. When the mode "specify display order (display on service-by-service basis)" is selected, the controller 31 displays a screen for specifying a display order of the storage services as illustrated in FIG. 16. In the example illustrated in FIG. 16, buttons 281 and 282 for specifying a display order of the storage services are displayed on a screen 280. The user U presses the buttons 281 and 282, and specifies a display order of the storage services. When the user U specifies a display order, the controller 31 generates mode data indicating the display order specified by the user U.

Figure 17:
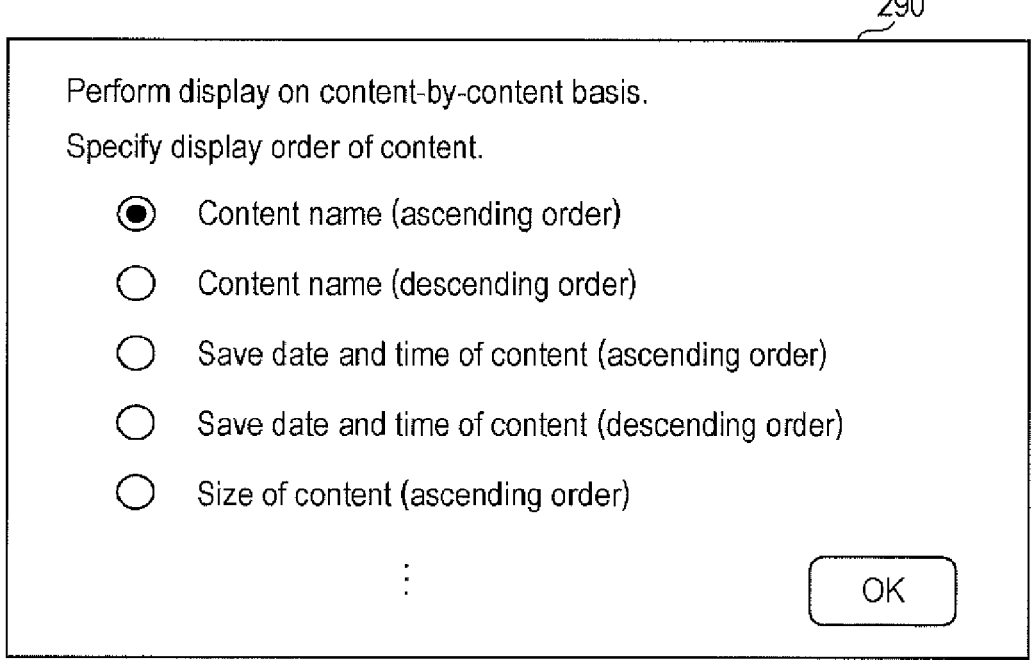
FIG. 17 is a diagram illustrating an exemplary screen for setting a display mode.

When the mode "specify display order (display on content-by-content basis)" is selected in the screen illustrated in FIG. 8, the controller 31 displays a screen for specifying a display order of content as illustrated in FIG. 17. In a screen 290 illustrated in FIG. 17, choices "content name (ascending order)", "save date and time of content", and the like are displayed as display orders for content, and the user U uses the operation unit 33 to select either of the displayed display orders. The controller 31 determines a display aspect of search results in accordance with information which is output from the operation unit 33, and generates mode data indicating the determined display aspect.

Figures 18, 19:
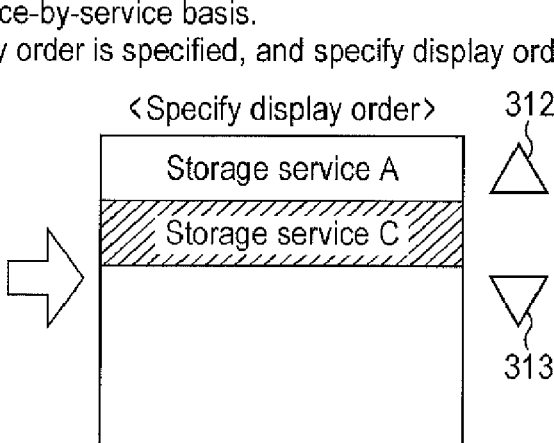
FIG. 18 is a diagram illustrating an exemplary screen for setting a display mode.
FIG. 19 is a diagram illustrating an exemplary screen for setting a display mode.

When the mode "combine above display rules" is selected in the screen illustrated in FIG. 8, the controller 31 displays a screen for selecting a combination of rules as illustrated in FIG. 18. In the screen illustrated in FIG. 18, the user U uses the operation unit 33 to select a combination of rules. The controller 31 determines a combination of rules in accordance with information which is output from the operation unit 33, and displays a screen for specifying a display order of content or services as illustrated in FIG. 19, on the display unit 34. In the example illustrated in FIG. 19, a screen 310 for specifying a display order for some services is displayed. The user U uses buttons 312 and 313 to specify a display order of storage services. When the user U specifies a display order, the controller 31 generates mode data indicating the display order specified by the user U. As described above, the mode data generated by the controller 31 in accordance with the setting of a display mode performed by the user U is transmitted to the relay apparatus 10 in step S31 in FIG. 9.

Receiving the mode data indicating a display mode from the client apparatus 30, the relay apparatus 10 stores it in a predetermined storage area of the relay apparatus 10, and generates data that is to be transmitted to the client apparatus 30, in accordance with the mode data. Receiving search results from the storage service providing apparatuses 20 (in steps S34-A and S34-B in FIG. 9), the controller 11 of relay apparatus 10 generates data indicating a screen on which the search results are displayed, in accordance with the mode data stored in the relay apparatus 10, and transmits the generated data to the client apparatus 30 (in step S35 in FIG. 9). For example, when the mode "not specified (display on content-by-content basis)" is selected by the user U, the controller 11 of the relay apparatus 10 generates data indicating the screen as illustrated in FIG. 10, and transmits the generated data to the client apparatus 30. The client apparatus 30 displays the screen showing the search results on the display unit 34 in accordance with the data received from the relay apparatus 10.

When the user U selects the mode "display the number of hits on service-by-service basis", the controller 11 generates data indicating a screen as illustrated in FIG. 15, and transmits the generated data to the client apparatus 30. The client apparatus 30 displays a screen as illustrated in FIG. 15 on the display unit 34 in accordance with the data received from the relay apparatus 10. In a screen 270 illustrated in FIG. 15, when the user U selects either of buttons 271, 272, 273, and 274 for displaying a content list in the search result from a storage service, the controller 31 displays a content list indicating the search result of a storage service corresponding to the selected button on the display unit 34 in accordance with the data indicating the search results received from the relay apparatus 10.

As described above, the search results for content are transmitted from the storage service providing apparatuses 20 at different timings depending on the storage service providing apparatuses 20, and a time lag may occur. Therefore, in the exemplary embodiment, at predetermined time intervals, the relay apparatus 10 generates data in which search results which have been received from storage service providing apparatuses 20 at that time are reflected, and transmits the data to the client apparatus 30 every time the data is generated. Every time the client apparatus 30 receives data from the relay apparatus 10, the client apparatus 30 updates the screen displayed on the display unit 34. Therefore, the screen displayed on the display unit 34 is continuously updated at predetermined time intervals.

1-7-3. Operation of Outputting Content

Figure 20:
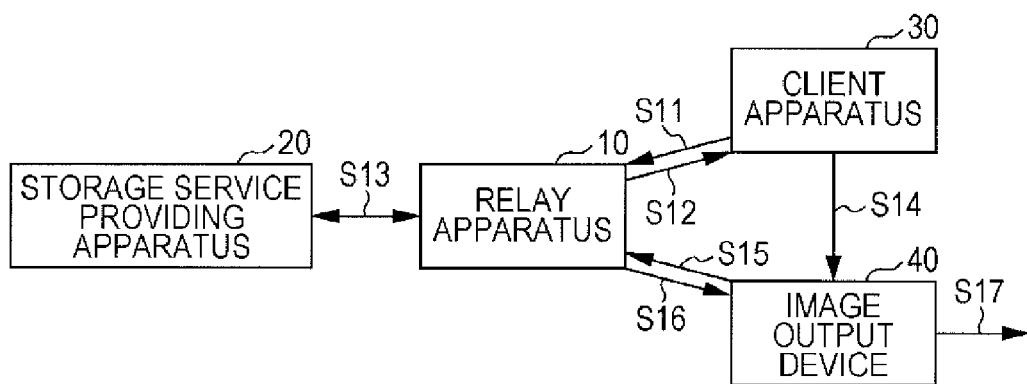
FIG. 20 is a diagram for describing an operation of outputting content.

An operation of outputting content will be described with reference to FIG. 20. The user U uses the operation unit 33 to select a piece of content from the list displayed on the display unit 34. The client apparatus 30 transmits an output instruction to output the selected content, to the relay apparatus 10 in accordance with information which is output from the operation unit 33 (in step S11). The output instruction includes either of the content identifiers displayed in the content list.

Receiving the output instruction from the client apparatus 30, the controller 11 of the relay apparatus 10 obtains content corresponding to the content identifier included in the received output instruction from the storage service providing apparatus 20, stores it in itself, and transmits a URI (acquisition destination information) indicating the storage location of the content to the client apparatus 30 (in step S12). The controller 11 performs a preparative process for obtaining the content which has been obtained from the storage service providing apparatus 20 (in step S13). Specifically, in the exemplary operation, when the data format of the content specified by the user U is not a data format in which the image output device 40 is capable of displaying content, the controller 11 converts the content into the data format in which the image output device 40 is capable of displaying content. In this case, the acquisition destination information transmitted in step S12 indicates a storage area for the content obtained through conversion.

Receiving the acquisition destination information of the content from the relay apparatus 10, the client apparatus 30 transmits the received acquisition destination information to the image output device 40, thereby notifying the image output device 40 of the acquisition destination information of the content (in step S14). Receiving the acquisition destination information from the client apparatus 30, the image output device 40 accesses the storage location indicated by the received acquisition destination information (in step S15). The relay apparatus 10 transmits the content stored in the accessed storage location (in step S16). The image output device 40 outputs an image represented by the content transmitted from the relay apparatus 10 by using the image forming unit 45 (in step S17).

Modified Embodiments

The above-described exemplary embodiment is an example of the present invention, and may be modified as follows. Modified embodiments described below may be combined with each other.

(1) In the above-described exemplary embodiment, the operation in which a user uses the client apparatus 30 to search storage services specified by the user via the relay apparatus 10 for content is described. The present invention is not limited to this, and the controller 41, the operation unit 43, and the display unit 44 of the image output device 40 may perform the processes performed by the controller 31, the operation unit 33, and the display unit 34 of the client apparatus 30.

Figure 21:
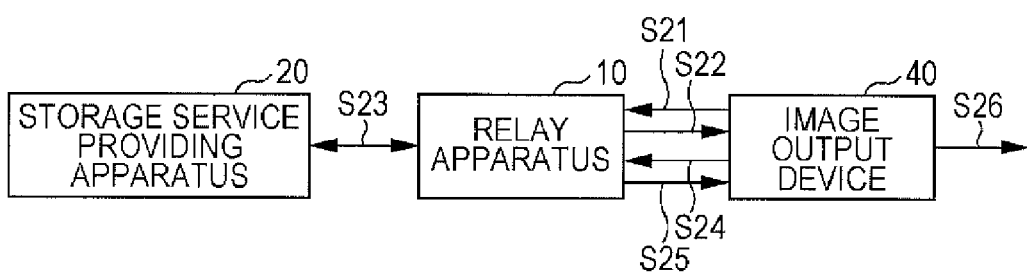
FIG. 21 is a diagram for describing an operation of outputting content.

An operation in which a user uses the image output device 40 to search storage services for content is similar to the operation using the client apparatus 30 illustrated in FIG. 9. An operation of outputting content will be described with reference to FIG. 21. A user U uses the operation unit 43 of the image output device 40 to select a piece of content from a list displayed on the display unit 44. The image output device 40 transmits a request to output the selected piece of content, to the relay apparatus 10 in accordance with information which is output from the operation unit 43 (in step S21). The output request includes either of the content identifiers displayed in the content list.

Receiving the output request from the image output device 40, the controller 11 of the relay apparatus 10 generates a URI (acquisition destination information) indicating a content storage location corresponding to the received output request, and transmits it to the image output device 40 (in step S22). The controller 11 requests a storage service providing apparatus 20 to obtain content corresponding to the content identifier included in the received output request, and obtains content corresponding to the content identifier from the storage service providing apparatus 20 (in step S23).

Receiving acquisition destination information of the content from the relay apparatus 10, the image output device 40 periodically accesses the URI indicated by the received acquisition destination information, and checks if print data has been generated (in step S24). The controller 11 of the relay apparatus 10 converts content obtained from the storage service providing apparatus 20 into print data in a format in which the image output device 40 is capable of outputting data, and stores the print data generated through conversion in the storage location indicated by the URI of the acquisition destination information. The image output device 40 periodically accesses the storage location indicated by the URI of the received acquisition destination information. When print data is stored in the storage location indicated by the URI, the image output device 40 obtains the print data from the storage location (in step S25). The image output device 40 outputs image data representing the content on the basis of the print data obtained from the relay apparatus 10, by using the image forming unit 45 (in step S26).

(2) In the above-described exemplary embodiment, every time a user searches for content, the user sets a display mode for search results. However, the timing at which a display mode is set is not limited to that in the above-described exemplary embodiment. For example, a configuration may be employed in which mode data indicating a display mode which is set by a user is stored in a predetermined storage area in the storage unit 35 of the client apparatus 30, and the controller 31 may refer to the mode data stored in the storage area to specify the display mode. In this case, a user simply sets a display mode once, and it is not necessary to set a mode every time searching is to be performed. In this case, the user may change the display mode at a desired timing. When the user uses the operation unit 33 to change the display mode, the controller 31 changes the mode data in accordance with information which is output from the operation unit 33.

As another example, a mode may be set at a timing at which the client apparatus is turned on. In addition, a default of the display mode may be predetermined. When a user does not select a display mode, the controller 31 may refer to the predetermined default and determine the display mode.

As another example, the relay apparatus 10 may store mode data transmitted by the client apparatus 30 to the relay apparatus 10. When display data indicating a screen displaying search results according to search request data transmitted from the client apparatus 30 after the transmission of mode data is to be generated, the relay apparatus 10 may generate display data in accordance with the mode data stored in advance. In this case also, it is not necessary for a user to set the mode every time searching is to be performed.

(3) In the above-described exemplary embodiment, the configuration is employed in which a screen displaying search results is updated at predetermined time intervals. However, the display aspect of search results is not limited to this, and the relay apparatus 10 may wait until all search results are received from the storage service providing apparatuses 20, and may transmit the search results to the client apparatus 30 at a time.

(4) In the above-described exemplary embodiment, the mode in which the display order is specified on a service-by-service basis, the mode in which the display order is specified on a content-by-content basis, and the like are taken as exemplary display modes for search results. The display modes are not limited to those in the above-described exemplary embodiment, and modes indicating other display aspects may be employed.

(5) In the above-described exemplary embodiment, the controller 11 of the relay apparatus 10 generates data (display data) indicating a screen displaying search results from the storage services, and transmits it to the client apparatus 30. The present invention is not limited to this, and the controller 31 of the client apparatus 30 may generate data indicating a screen displaying search results. In this case, the controller 11 of the relay apparatus 10 (exemplary content identifier conversion unit and content identifier transmission unit) converts content identifiers received from storage service providing apparatuses 20, in accordance with identifier conversion routines corresponding to the storage service providing apparatuses 20 which are read out from the management table (see FIG. 2B), and transmits a list of the content identifiers obtained through the conversion to the client apparatus 30. Then, the client apparatus 30 may display the content identifiers indicating the search results received from the relay apparatus 10, in accordance with the display mode which has been set by a user.

(6) In the above-described exemplary embodiment, a timeout may be set for the process of searching a storage service providing apparatus 20. For example, a user may set a timeout period by using the operation unit 33. When the time period which is set by the user has elapsed, the relay apparatus 10 may transmit data indicating search results which have been received at that time point, to the client apparatus 30. In the case where the relay apparatus 10 transmits search results one by one which are received from the storage service providing apparatuses 20, to the client apparatus 30, after the time period which is set by the user has elapsed, it is possible for the relay apparatus 10 not to receive search results from the storage service providing apparatuses 20, or not to transmit received search results to the client apparatus 30.

(7) The configuration of the communication system 1 is not limited to the configuration described in the above-described exemplary embodiment. For example, the number of units included in the communication system 1 may be different from the number of units in the exemplary embodiment. For example, in the above-described exemplary embodiment, the example is described in which the communication system 1 is provided with one image output device 40. The number of image output devices 40 is not limited to one, and may be more than one. In addition, in the above-described exemplary embodiment, one storage service providing apparatus provides one storage service. The present invention is not limited to this, and multiple servers may provide one storage service.

In the above-described exemplary embodiment, the case where three storage services are provided is described. However, the number of storage services are not limited to three, and may be more than or less than three.

In the above-described exemplary embodiment, the client apparatus 30 and the image output device 40 are separately provided. Alternatively, these units may be integrated into one unit.

(8) In the above-described exemplary embodiment, the configuration is employed in which a service identifier for identifying a storage service and access destination information indicating information used to access a storage service providing apparatus 20 are separately used. The present invention is not limited to this, and a service identifier and access destination information may be unified into one piece of data. For example, a configuration may be employed in which a URI used to access a storage service providing apparatus 20 is used to identify a storage service.

(9) The image output device 40 described in the above-described exemplary embodiment is an exemplary apparatus to which the relay apparatus 10 provides a service. This apparatus may be another apparatus, such as a personal computer (PC), a tablet PC, or a cellular phone.

(10) A program executed in the relay apparatus 10, the storage service providing apparatuses 20, the client apparatus 30, or the image output device 40 may be downloaded via a communication line such as the Internet. Alternatively, the program may be provided by recording the program in a computer-readable recording medium, such as a magnetic recording medium (for example, a magnetic tape or a magnetic disk), an optical recording medium (for example, an optical disk), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
    a processor connected to a memory and configured to:
    receive, from a client apparatus, a search query to a plurality storage services and a result display mode which are inputted by a user of the client apparatus;
    convert the inputted search query into a format for each of the plurality of storage services;
    transmit the converted search query to each of the plurality of storage services;
    receive search results from each of the plurality of storage services;
    control so as to vary a timing and/or a way of generating search results information according to the received result display mode;
    generate the search results information using the received search results in accordance with the controlled timing and/or way of generating search results information; and
    send the generated search results information to the client apparatus,
    wherein the processor is further configured to receive a timeout period, and, when the timeout period has elapsed, the processor transmits only the generated search results information that have been received at a time when the timeout period has elapsed.

2. The relay apparatus according to claim 1, wherein in a case where when the result display mode is not specified, the search results information is generated in order of receipt from the plurality of the storage services.

3. The relay apparatus according to claim 2, wherein in a case where the result display mode is service mode and the order of service is specified, the search results information is generated after results from the order-specified services are received.

4. The relay apparatus according to claim 1,
    wherein the processor is configured to control so as to vary the timing according to the received result display mode.

5. The relay apparatus according to claim 1,
    wherein the processor is configured to control so as to vary the way of generating search results information according to the received result display mode.

6. A non-transitory computer readable medium storing a program causing a computer to execute a process comprising:
    receiving, from a client apparatus, a search query to a plurality storage services and a result display mode which are inputted by a user of the client apparatus;
    converting the inputted search query into a format for each of the plurality of storage services;
    transmitting the converted search query to each of the plurality of storage services;
    receiving search results from each of the plurality of storage services;
    controlling so as to vary a timing and/or a way of generating search results information according to the received result display mode;
    generating the search results information using the received search results in accordance with the controlled timing and/or way of generating search results information;
    sending the generated search results information to the client apparatus; and
    receiving a timeout period, and, when the timeout period has elapsed, the sending includes sending only the generated search results information that have been received at a time when the timeout period has elapsed.

* * * * *